United States Patent
Stokes et al.

(10) Patent No.: US 11,607,856 B2
(45) Date of Patent: Mar. 21, 2023

(54) POROUS MEMBRANE WIPES AND METHODS OF MANUFACTURE AND USE

(71) Applicant: Celgard, LLC, Charlotte, NC (US)

(72) Inventors: Kristoffer K. Stokes, Charlotte, NC (US); Karl F. Humiston, Fort Mill, SC (US); Changqing Wang Adams, Fort Mill, SC (US); William John Mason, McConnells, SC (US)

(73) Assignee: Celgard, LLC, Charlotte, NC (US)

( * ) Notice: Subject to any disclaimer, the term of this patent is extended or adjusted under 35 U.S.C. 154(b) by 273 days.

(21) Appl. No.: 14/515,755

(22) Filed: Oct. 16, 2014

(65) Prior Publication Data

US 2015/0107042 A1    Apr. 23, 2015

Related U.S. Application Data

(60) Provisional application No. 61/892,730, filed on Oct. 18, 2013.

(51) Int. Cl.

| | |
|---|---|
| *B29D 99/00* | (2010.01) |
| *B29C 48/92* | (2019.01) |
| *B29C 48/91* | (2019.01) |
| *B29K 101/00* | (2006.01) |
| *B29K 23/00* | (2006.01) |
| *B29L 31/00* | (2006.01) |

(52) U.S. Cl.
CPC ............ *B29D 99/005* (2013.01); *B29C 48/91* (2019.02); *B29C 48/92* (2019.02); *B29C 2948/92704* (2019.02); *B29K 2023/12* (2013.01); *B29K 2101/00* (2013.01); *B29L 2031/755* (2013.01)

(58) Field of Classification Search
None
See application file for complete search history.

(56) References Cited

U.S. PATENT DOCUMENTS

| | | | |
|---|---|---|---|
| 5,281,413 A | 1/1994 | Abrutyn et al. | |
| 6,057,061 A | 5/2000 | Callahan et al. | |
| 6,080,507 A | 6/2000 | Yu | |
| 6,602,593 B1 | 8/2003 | Callahan et al. | |
| 8,795,565 B2 | 8/2014 | Wei et al. | |
| 2002/0110655 A1* | 8/2002 | Seth ........................ | B32B 5/18 428/35.2 |
| 2002/0155234 A1 | 10/2002 | Seth | |
| 2003/0197939 A1 | 10/2003 | Tsuchimoto et al. | |
| 2006/0147503 A1 | 7/2006 | Floyd | |
| 2006/0148915 A1 | 7/2006 | Floyd et al. | |
| 2007/0037721 A1* | 2/2007 | Michels ................. | C11D 7/265 510/295 |
| 2007/0178324 A1* | 8/2007 | Masuda ................... | C08J 5/18 428/500 |
| 2007/0196638 A1 | 8/2007 | Wei et al. | |
| 2010/0279068 A1 | 11/2010 | Cook et al. | |
| 2011/0223486 A1 | 9/2011 | Zhang et al. | |

FOREIGN PATENT DOCUMENTS

| | | | |
|---|---|---|---|
| JP | 05-018392 U | * | 3/1993 |
| JP | 2005-139227 A | | 6/2005 |

OTHER PUBLICATIONS

English Machine Translation of JP 05-018392.*
Robert E. Resting, "Stretched Semicrystalline Films," Synthetic Polymeric Membranes A Structural Perspective, 2 ed., John Wiley & Sons (New York), (p. 290-297), (1985).
Robert E. Resting, "Phase-Inversion Membranes," Synthetic Polymeric Membranes A Structural Perspective, 2 ed., John Wiley & Sons (New York), (p. 237-286), (1985).
R. Kesting, "Synthetic Polymeric Membranes, A Structural Perspective," 2 ed., John Wiley & Sons (New York, NY), (1985).

* cited by examiner

*Primary Examiner* — Nicole Blan
(74) *Attorney, Agent, or Firm* — Hammer & Associates, P.C.

(57) ABSTRACT

A microporous membrane wipe and a method of using such microporous membrane wipe are disclosed. The microporous membrane wipe may be uniaxially or biaxially oriented microporous membrane. The uniaxially or biaxially oriented microporous membrane may be made from one or more block and/or impact copolymers of polyethylene and/or polypropylene. A method of using such a microporous membrane wipe for skin oil blotting is also disclosed. Further disclosed is a method of using such a microporous membrane wipe for cleaning a surface for the removal of fingerprints, smudges and the like, where such surfaces may include, for example, eyeglasses, electronics, cell phones, displays, optical devices, camera lenses, microscope lenses and other precision optics, and/or the like.

17 Claims, No Drawings

POROUS MEMBRANE WIPES AND METHODS OF MANUFACTURE AND USE

CROSS REFERENCE TO RELATED APPLICATION

The instant application claims the benefit of and priority to U.S. Provisional Patent Application Ser. No. 61/892,730, filed Oct. 18, 2013.

FIELD OF THE INVENTION

The instant application relates to new or improved microporous membranes, new or improved porous membrane wipes, new or improved microporous membrane wipes, and/or methods of manufacture, marketing, and/or use thereof. The instant invention is directed toward a new or improved method for oil blotting utilizing a microporous membrane wipe, like use in blotting oil from one's skin or face, and/or the removal of fingerprints, smudges and the like from other surfaces like eyeglasses, electronics, cell phones, displays, optical devices, camera lenses, microscope lenses and other precision optics, and/or the like. In at least select embodiments, the microporous membrane wipes may include a uniaxially or biaxially oriented (or stretched) microporous membrane. In at least select embodiments, the microporous membrane wipes may include a uniaxially or biaxially oriented (or stretched) microporous membrane made from one or more copolymers such as block and/or impact copolymers of polyethylene and/or polypropylene.

BACKGROUND OF THE INVENTION

Microporous membranes are known and can be made by various processes. The process by which the membrane is made has a material impact upon the membrane's physical attributes. See, Kesting, R., Synthetic Polymeric Membranes, A structural perspective, Second Edition, John Wiley & Sons, New York, N.Y., (1985). Three commercially viable processes for making microporous membranes include: the dry-stretch process (also known as the CELGARD® process), the wet process, and the particle stretch process.

The dry-stretch process refers to a process where pore formation results from stretching a nonporous precursor. See, Kesting, Ibid. pages 290-297, incorporated herein by reference. The dry-stretch process is different from the wet process and particle stretch process. Generally, in the wet process, also known as the phase inversion process, or the extraction process or the TIPS process (to name a few), the polymeric raw material is mixed with a processing oil (sometimes referred to as a plasticizer), this mixture is extruded, and pores are then formed when the processing oil is removed (these films may be stretched before or after the removal of the oil). See, Kesting, Ibid. pages 237-286, incorporated herein by reference. Generally, in the particle stretch process, the polymeric raw material is mixed with particulate, this mixture is extruded, and pores are formed during stretching when the interface between the polymer and the particulate fractures due to the stretching forces. See, U.S. Pat. Nos. 6,057,061 and 6,080,507, incorporated herein by reference.

Moreover, the membranes arising from these processes are physically different and the process by which each is made distinguishes one membrane from the other. Some dry-stretch membranes in the past have had slit shaped pores due to a previous inability to stretch the precursor in the transverse machine direction. Some wet process membranes have had rounder pores due to an ability to stretch the precursor in the transverse machine direction. Particle stretched membranes, on the other hand, are filled with particulate needed for pore formation. Accordingly, each membrane may be distinguished from the other by its method of manufacture.

While membranes made by the dry-stretch process have met with excellent commercial success, there is a constant need to improve their physical attributes, so that they may be used in a wider spectrum of applications. Some areas of improvement include and have included forming membranes having pore shapes other than slits and forming membranes having increased transverse direction tensile strength.

U.S. Pat. No. 6,602,593 is directed to a microporous membrane, made by a dry-stretch process, where the resulting membrane has a ratio of transverse direction tensile strength to machine direction tensile strength of 0.12 to 1.2. Herein, the TD/MD tensile ratio is obtained by a blow-up ratio of at least 1.5 as the precursor is extruded.

U.S. Patent Publication No. 20070196638, now U.S. Pat. No. 8,795,565, incorporated herein in its entirety, discloses a microporous membrane made by a dry-stretch process. The microporous membrane has substantially round shaped pores and a ratio of machine direction tensile strength to transverse direction tensile strength in the range of 0.5 to 5.0. The method of making the foregoing microporous membrane includes the steps of: extruding a polymer into a nonporous precursor, and biaxially stretching the nonporous precursor, the biaxial stretching including a machine direction stretching and a transverse direction stretching, the transverse direction including a simultaneous controlled machine direction relax.

U.S. Patent Publication No. 20110223486, incorporated herein in its entirety, discloses a microporous membrane made by a dry-stretch process that has substantially round shaped pores and a ratio of machine direction tensile strength to transverse direction tensile strength in the range of 0.5 to 6.0. The method of making the foregoing microporous membrane may include the steps of: extruding a polymer into a nonporous precursor, and biaxially stretching the nonporous precursor, the biaxial stretching including a machine direction stretching and a transverse direction stretching, the transverse direction including a simultaneous controlled machine direction relax. At least selected embodiments of such membranes were disclosed to be directed to biaxially oriented porous membranes, composites including biaxially oriented porous membranes, biaxially oriented microporous membranes, biaxially oriented macroporous membranes, battery separators, filtration media, humidity control media, flat sheet membranes, liquid retention media, and the like, related methods, methods of manufacture, methods of use, and the like.

While membranes made by the dry-stretch process have met with excellent commercial success, such as a variety of CELGARD® dry-stretch porous membranes sold by Celgard, LLC of Charlotte, N.C., including flat sheet membranes, battery separators, hollow fibers, and the like, it has been found that some such porous membranes may be used in a wider spectrum of applications, may perform better for particular purposes, or the like.

The use of wipes to remove or reduce the accumulation of oil, like skin oil, on the surface of people's skin, especially their faces, along with the surfaces of other objects (like fingerprints, smudges, and the like on eyeglasses, electronics, cell phones, displays, optical devices, camera lenses, microscope lenses and other precision optics, the like, etc.)

is known. Oil, smudges, fingerprints, the like, etc. have long been recognized as imparting an undesirable sheen and/or feel. In order to remove the oil, fingerprints and/or smudges, people use various blotting materials or wipes. The principal materials in use today for the skin and face include various types of papers (i.e. cellulose based) and natural or synthetic non-wovens. Some desired features of these materials include, but are not limited to, the following: pleasant to the touch, both to the fingers and the face; absorbs oil without leaving oily residue on the fingers; provides visual indication of the absorbed oil; and absorbs oil without smearing or otherwise interfering with facial cosmetics. The most common material used for the surfaces of objects, like eyeglasses, electronics, cell phones, displays, optical devices, camera lenses, microscope lenses and other precision optics, the like, etc. are lint free technical wipes. One example of such a lint free technical wipe is the Kimtech™ Touchscreen Wipe sold by the Kimberly-Clark Corporation. Some desired features of these materials include, but are not limited to, the following: designed for delicate tasks; low lint; non-abrasive; pleasant to the touch; absorbs oil without leaving oily residue on the fingers; provides visual indication of the absorbed oil; and anti-static dispensing.

Therefore, there is clearly a need to develop new or improved wipes that provide unique features for certain applications, for certain conditions, or the like.

SUMMARY OF THE INVENTION

In accordance with at least selected embodiments, the instant invention addresses the above mentioned problem or need and provides a microporous membrane wipe.

Microporous membranes, like the Celgard® membranes discussed in the background section above, have been discovered to be usable as wipes for various applications, including, but not limited to, skin and facial oil blotting wipes, eyeglass wipes, electronic wipes like for cellphones, displays, etc., optical wipes like for optical devices, camera lenses, microscope lenses and other precision optics, the like, etc.

In one embodiment, the microporous membrane wipes of the instant invention may be used for blotting skin oils, like from the skin or face. Some desired features of the microporous membrane wipes of the instant invention being used as oil blotting wipes may include, but are not limited to: pleasant to the touch, both to the fingers and the face; absorbs oil without leaving oily residue on the fingers; provides visual indication of the absorbed oil; and absorbs oil without smearing or otherwise interfering with facial cosmetics. Particularly in regard to the second, third, and fourth performance measures listed above, the microporous membrane wipes of the instant invention have been found to perform as well as or better than the best commercially available skin blotters, such as Clean & Clear® by J&J and private label products from retail chains such as CVS, Walgreens, and Target. The excellent performance of the instant invention of microporous membrane wipes as skin oil blotters may result from their inherent oleophilicity and high porosity. In addition, the microporous membrane wipes of the instant invention may be oil-free, whereas certain other membranes and/or membrane wipes may contain mineral oil. Therefore, in certain embodiments, the microporous membrane wipes of the instant invention are oil-free, and more particularly, mineral oil-free.

In another embodiment, the microporous membrane wipes of the instant invention may be used for cleaning surfaces of oil, fingerprints, smudges, etc., including, but not limited to, eyeglasses, electronics, cell phones, displays, optical devices, camera lenses, microscope lenses and other precision optics, the like, etc. Some desired features of the microporous membrane wipes of the instant invention being used as surface cleaners may include, but are not limited to, the following: designed for delicate tasks; low lint; non-abrasive; pleasant to the touch; absorbs oil without leaving oily residue on the fingers; provides visual indication of the absorbed oil; and anti-static dispensing. The microporous membrane wipes of the instant invention have been found to work extremely well as a lint free technical wipe for optics and other technical needs. Fingerprints, smudges, and the like on display screens, eyeglasses, and similar surfaces are largely oil-based. Consequently, the instant microporous membrane wipes may work particularly well as wipes for these surfaces because of their oil absorption properties. The microporous membrane wipes may also have the additional benefits of being very soft to the touch and having very high porosity, thus enhancing its absorptive properties. Similar to the applications that Kimwipes® are typically used for, the instant microporous membrane wipes, and particularly uniaxially or biaxially stretched impact and/or block copolymer membrane wipes, could find wide use as clean room wipes, wipes in environments where cleanliness is highly desired, wipes for high precision optics, or even in consumer products as disposable eyeglass wipes in lieu of microfiber cleaning cloths. The phrase "impact copolymers" often refers to various modified polymers and/or copolymers, including, but not limited to, polymers and/or copolymers having a dispersed rubber phase within a homopolymer or polymer matrix.

In one embodiment, the microporous membrane wipes of the instant invention could be uniaxially-oriented Celgard® membranes and/or films. In other embodiments, the microporous membrane wipes of the instant invention may be biaxially-oriented Celgard® membranes, such as those disclosed in U.S. Patent Publication Nos. 20070196638 (now U.S. Pat. No. 8,795,565) and 20110223486. Such biaxially-oriented membranes may be preferred as they may perform even better as skin oil blotters than some other membranes because biaxial orientation may increase the membranes' porosity. Moreover, biaxially-oriented Celgard® membranes made from block and/or impact copolymers of polyethylene and polypropylene have the additional advantage of exceptionally pleasant touch, relative both to Celgard® membranes made from pure polypropylene and to commercially available skin oil blotters. However, the invention is not so limited to the preferred biaxially-oriented microporous membrane wipes, and uniaxially-oriented microporous membrane wipes may also be used as the microporous membrane wipes of the instant invention. In some embodiments of the present invention, the microporous membrane wipes are single-layer wipes. In other embodiments of the present invention, the microporous membrane wipes are double-layer wipes. In still other embodiments of the present invention, the microporous membrane wipes comprise three or more layers of microporous membrane or other materials.

In one embodiment, the microporous membrane wipe may be made by a dry-stretch process and have substantially round shaped pores and a ratio of machine direction tensile strength to transverse direction tensile strength in the range of 0.5 to 5.0. The microporous membrane wipe may be a thin, pliable, polymeric sheet, or film having a plurality of pores therethrough.

Regarding the pore shape, the pores of the microporous membrane wipes may be characterized as substantially round shaped. Further, the pore shape of the instant wipes may be characterized by an aspect ratio, the ratio of the length to the width of the pore. In one embodiment of the instant wipes, the aspect ratio of the round or substantially round shaped pores ranges from 0.75 to 1.25.

Regarding the ratio of machine direction tensile strength to transverse direction tensile strength, in one embodiment, this ratio is between about 0.5 and about 5.0, in some embodiments, about 1.0 to about 5.0.

The instant microporous membrane wipes may be further characterized as follows: an average pore size in the range of 0.03 to 0.50 microns (μm); a porosity in the range of 20-90%, in some embodiments, 20-80%, in some embodiments, 40-90%, in some embodiments, 65-90%, and in some embodiments 40-80%; and/or a transverse direction tensile strength of greater than or equal to about 175 Kgf/cm$^2$, in some embodiments, greater than or equal to about 225 Kgf/cm$^2$. In certain embodiments, the microporous membrane wipes of the present invention may have a JIS (Japanese Industrial Standard) Gurley of less than about 60 seconds, in some embodiments, less than about 40 seconds, and in other embodiments, less than about 30 seconds. The JIS Gurley is gas permeability measured, for example, by using the OHKEN permeability tester. JIS Gurley may be defined as the time in seconds required for 100 cc of air to pass through one square inch of film or membrane at constant pressure of 4.8 inches of water (or 1196 Pascals).

In some embodiments of the present invention, a microporous membrane wipe may have a pore size, as measured using an Aquapore tester, of at least about 0.06 microns, in some embodiments, at least about 0.07 microns, and in some embodiments, at least about 0.08 microns. In other particular embodiments, the pore size of a microporous membrane wipe, as measured using an Aquapore tester, may be about 0.1 micron to about 0.5 micron, in some embodiments, about 0.1 micron to about 0.3 micron, and in still other embodiments, about 0.15 micron to about 0.2 micron. An Aquapore tester is commercially available through PMI (Porous Materials Inc.). Pore size measured by the Aquapore is expressed in microns (μm). In various embodiments, the microporous membrane wipes of the present invention may include a microporous membrane having a hydro-head pressure of greater than about 140 psi.

In various embodiments, the microporous membrane wipe comprises a membrane or film having a thickness of at least about 4 microns, preferably about 8 microns, and in some embodiments, between about 8 to about 80 microns. The foregoing values are exemplary values and are not intended to be limiting, and accordingly should be viewed as merely representative of the instant microporous membrane wipes.

The polymers used in the instant microporous membrane wipes may be characterized as thermoplastic polymers. These polymers may be further characterized as semi-crystalline polymers. In one embodiment, semi-crystalline polymer may be a polymer having a crystallinity in the range of 20 to 80%. Such polymers may be selected from the following group: polyolefins, fluorocarbons, polyamides, polyesters, polyacetals (or polyoxymethylenes), polysulfides, polyvinyl alcohols, co-polymers thereof (such as impact and/or block copolymers thereof), blends thereof, and combinations thereof. Polyolefins may include polyethylenes (LDPE, LLDPE, HDPE, UHMWPE), polypropylene, polybutene, polymethylpentene, co-polymers thereof (including block and/or impact co-polymers thereof), and blends thereof. Fluorocarbons may include polytetrafluoroethylene (PTFE), polychlorotrifluoroethylene (PCTFE), fluorinated ethylene propylene (FEP), ethylene chlorotrifluoroethylene (ECTFE), ethylene tetrafluoroethylene (ETFE), polyvinylidene fluoride (PVDF), polyvinylfluoride (PVF), perfluoroalkoxy (PFA) resin, co-polymers thereof, and blends thereof. Polyamides may include, but are not limited to: polyamide 6, polyamide 6/6, Nylon 10/10, polyphthalamide (PPA), co-polymers thereof, and blends thereof. Polyesters may include polyester terephthalate (PET), polybutylene terephthalate (PBT), poly-1-4-cyclohexylenedimethylene terephthalate (PCT), polyethylene naphthalate (PEN), and liquid crystal polymers (LCP). Polysulfides include, but are not limited to, polyphenylsulfide, polyethylene sulfide, co-polymers thereof, and blends thereof. Polyvinyl alcohols include, but are not limited to, ethylene-vinyl alcohol, co-polymers thereof, and blends thereof.

In a possibly preferred embodiment, the polymers used in the instant microporous membrane wipes may be copolymers, impact and/or block copolymers of polypropylene and/or polyethylene (by way of example, polypropylene (PP) with ethylene-propylene rubber or ethylene-propylene elastomer (EPR)).

In other select embodiments, the instant wipe may include other ingredients. For example, those ingredients may include: fillers (inert particulates used to reduce the cost of the wipe, but otherwise having no significant impact on the manufacture of the wipe or its physical properties), anti-static agents, anti-blocking agents, anti-oxidants, lubricants (to facilitate manufacture), and the like.

In other various embodiments of the microporous membrane wipes, various materials may be added to the polymers to modify or enhance the properties of the wipe. Such materials include, but are not limited to: (1) polyolefins or polyolefin oligomers with a melting temperature less than 130° C.; (2) Mineral fillers include, but are not limited to: calcium carbonate, zinc oxide, diatomaceous earth, talc, kaolin, synthetic silica, mica, clay, boron nitride, silicon dioxide, titanium dioxide, barium sulfate, aluminum hydroxide, magnesium hydroxide and the like, and blends thereof; (3) Elastomers include, but are not limited to: ethylene-propylene (EPR), ethylene-propylene-diene (EPDM), styrene-butadiene (SBR), styrene isoprene (SIR), ethylidene norbornene (ENB), epoxy, and polyurethane and blends thereof; (4) Wetting agents include, but are not limited to, ethoxylated alcohols, primary polymeric carboxylic acids, glycols (e.g., polypropylene glycol and polyethylene glycols), functionalized polyolefins etc.; (5) Lubricants, for example, silicone, fluoropolymers, Kemamide®, oleamide, stearamide, erucamide, calcium stearate, or other metallic stearate; (6) flame retardants for example, brominated flame retardants, ammonium phosphate, ammonium hydroxide, alumina trihydrate, and phosphate ester; (7) cross-linking or coupling agents; (8) polymer processing aid; and (9) Any types of nucleating agents including beta-nucleating agent for polypropylene. In various embodiments, the polymer or polymers used to make the microporous membrane wipe may exclude any oils for subsequent removal to form pores or any pore-forming materials to facilitate pore formation.

The instant microporous membrane wipes may be a single ply or multi-ply membrane wipe. Regarding the multi-ply membrane wipe, the instant membrane wipe may be one ply of the multi-ply membrane wipe or the instant wipe may be all of the plies of the multi-ply wipe. If the instant wipe is less than all of the plies of the multi-ply wipe, the multi-ply wipe may be made via a lamination process. If the instant wipe is all plies of the multi-ply wipe, the multi-ply wipe may be made via an extrusion process, such as a coextrusion process, or via a lamination process. Further, multi-ply wipes may be made of plies of the same materials or of differing materials. Additionally, in some embodiments, the microporous membrane wipe may include one or more layers of a microporous membrane and further include at least one other layer or material such as a coating or a nonwoven layer, woven layer, or knit layer bonded to at least one side of the membrane or film.

In select possibly preferred embodiments, the instant microporous membrane wipe may be made by a dry-stretch process where a single-layer precursor or a multi-layer precursor is formed. In some embodiments, the precursor membrane is uniaxially stretched. In other select, possibly preferred embodiments, the instant microporous membrane wipe may be made by a dry-stretch process where the precursor membrane is biaxially stretched (i.e., not only stretched in the machine direction, but also in the transverse machine direction). This process is discussed in great detail in U.S. Patent Publication Nos. 20070196638 (now U.S. Pat. No. 8,795,565) and 20110223486, which are incorporated herein by reference, and discussed further below.

In general, the process for making the foregoing microporous membrane wipes may include the steps of extruding a nonporous precursor (single-layer or multi-layer precursor), and then uniaxially or biaxially stretching the nonporous precursor. In various embodiments, the biaxial stretching step of a dry-stretch process includes the simultaneous biaxial stretching of a plurality of separate, superimposed, layers or plies of nonporous precursor, wherein none of the plies or layers are bonded together during the stretching process. In other embodiments, the biaxial stretching step of a dry-stretch process includes the simultaneous biaxial stretching of a plurality of bonded, superimposed, layers or plies of nonporous precursor, wherein all of the plies are bonded together during the stretching process. Optionally, the nonporous precursor may be annealed prior to stretching. In one embodiment, the biaxial stretching includes a machine direction stretch and a transverse direction stretch, the transverse direction stretch including a simultaneous controlled machine direction relax. The machine direction stretch and the transverse direction stretch may be simultaneous or sequential. In one embodiment, the machine direction stretch is followed by the transverse direction stretch with the simultaneous machine direction relax. In other embodiments of the present invention, the biaxial stretching process includes sequential machine direction stretching followed by transverse direction stretching, where the transverse direction stretching does not include a simultaneous controlled machine direction relax. The use of various copolymers, such as one or more impact or block copolymers, may enable such a stretching process, which does not require the transverse direction stretching to include a simultaneous controlled machine direction relax. Such a process may improve throughput and/or speed of making such microporous membrane wipes and therefore may decrease costs associated with making such microporous membrane wipes when compared to a more complex process that includes a simultaneous controlled machine direction relax during a transverse direction stretching step. These and other processes are discussed in greater detail below.

Extrusion may be generally conventional (conventional refers to conventional for a dry-stretch process). The extruder may have a slot die (for flat nonporous precursor) or an annular die (for a parison and/or blown film, nonporous precursor). In the case of the latter, an inflated parison and/or blown film technique may be employed (e.g., a blow up ratio (BUR)). However, the birefringence of the nonporous precursor may not have to be as high as in the conventional dry-stretch process. Birefringence may refer to various optical properties of a material, such as, for example, the nonporous precursor used to make the instant microporous membrane wipes. The birefringence of the nonporous precursor may suggest to a user something about the crystallinity of the nonporous precursor, may suggest how easily the material will become porous during a subsequent stretching process, and/or may aid a user in designing one or more stretch processes to be used in making a microporous membrane from the nonporous precursor. Such birefringence of a nonporous precursor (which, in various embodiments, appears clear or transparent) may be measured, for example, using an optical microscope. For example, in a conventional dry-stretch process to produce a wipe with a >35% porosity from a polypropylene resin, the birefringence of the precursor would be >0.0130; while with various embodiments involved in making the instant microporous membrane wipes, the birefringence of the PP precursor could be as low as 0.0100. In another example, a wipe with a >35% porosity from a polyethylene resin, the birefringence of the precursor would be >0.0280; while with various embodiments involved in making the instant microporous membrane wipes, the birefringence of the PE precursor could be as low as 0.0240. By way of example only, the use of a block and/or impact copolymer in making the microporous membrane wipes of the present invention may provide a nonporous precursor with a birefringence lower than that of conventional precursors used in other processes.

Annealing (optional) may be carried out, in one embodiment, at temperatures between $T_m-80°$ C. and $T_m-10°$ C. (where $T_m$ is the melt temperature of the polymer); and in another embodiment, at temperatures between $T_m-50°$ C. and $T_m-15°$ C. Some materials, e.g., those with high crystallinity after extrusion, such as polybutene, may require no annealing.

Machine direction stretch may be conducted as a cold stretch or a hot stretch or both, and as a single step or multiple steps. In one embodiment, cold stretching may be carried out at $<T_m-50°$ C., and in another embodiment, at $<T_m-80°$ C. In one embodiment, hot stretching may be carried out at $<T_m-10°$ C. In one embodiment, total machine direction stretching may be in the range of 50-500%, and in another embodiment, in the range of 100-300%. During machine direction stretch, the precursor may shrink in the transverse direction.

Transverse direction stretching includes a simultaneous controlled machine direction relax. This means that as the precursor is stretched in the transverse direction the precursor is simultaneously allowed to contract (i.e., relax), in a controlled manner, in the machine direction. The transverse direction stretching may be conducted as a cold step, or a hot step, or a combination of both. In one embodiment, total transverse direction stretching may be in the range of 100-1200%, and in another embodiment, in the range of 200-900%. In one embodiment, the controlled machine direction relax may range from 5-80%, and in another embodiment, in the range of 15-65%. In one embodiment, transverse stretching may be carried out in multiple steps. During transverse direction stretching, the precursor may or may not be allowed to shrink in the machine direction. In various embodiments of the present invention, the transverse direction shrinkage of the membrane or film making up part or all of the microporous membrane wipe may be less than about 6.0% at a temperature of about 90° C., and/or may be less than about 15.0% at a temperature of about 120° C. In an embodiment of a multi-step transverse direction stretching, the first transverse direction step may include a transverse stretch with the controlled machine relax, followed by simultaneous transverse and machine direction stretching, and followed by transverse direction relax and no machine direction stretch or relax.

Optionally, the precursor, after machine direction and transverse direction stretching may be subjected to a heat setting, as is well known.

The foregoing microporous membrane wipe and process are further illustrated in the following non-limiting examples.

EXAMPLES

The test values reported herein, thickness, porosity, tensile strength, and aspect ratio, were determined as follows: thickness—ASTM-D374 using the Emveco Microgage 210-A micrometer; porosity—ASTM D-2873; tensile strength—ASTM D-882 using an Instron Model 4201; and aspect ratio-measurements taken from analyzing SEM images for pore size, pore diameter, and/or pore dimensions.

The following examples were produced by conventional dry-stretched techniques, except as noted.

Example 1

Polypropylene (PP) resin is extruded using a 2.5 inch extruder. The extruder melt temperature is 221° C. Polymer melt is fed to a circular die. The die temperature is set at 220° C., polymer melt is cooled by blowing air. Extruded precursor has a thickness of 27 μm and a birefringence of 0.0120. The extruded film was then annealed at 150° C. for 2 minutes. The annealed film is then cold stretched to 20% at room temperature, and then hot stretched to 228% and relaxed to 32% at 140° C. The machine direction (MD) stretched film has a thickness of 16.4 microns (μm), and porosity of 25%. The MD stretched film is then transverse direction (TD) stretched 300% at 140° C. with MD relax of 50%. The finished film has a thickness of 14.1 microns, and porosity of 37%. TD tensile strength of finished film is 550 Kgf/cm$^2$.

Example 2

Polypropylene (PP) resin is extruded using a 2.5 inch extruder. The extruder melt temperature is 220° C. Polymer melt is fed to a circular die. The die temperature is set at 200° C., polymer melt is cooled by blowing air. Extruded precursor has a thickness of 9.5 μm and a birefringence of 0.0160. HDPE resin is extruded using a 2.5 inch extruder. The extruder melt temperature is 210° C. Polymer melt is fed to a circular die. Die temperature is set at 205° C., polymer melt is cooled by air. Extruded precursor has a thickness of 9.5 μm and a birefringence of 0.0330. Two PP layers and one PE layer are laminated together to form a PP/PE/PP tri-layer film. Lamination roll temperature is 150° C. Laminated tri-layer film is then annealed at 125° C. for 2 minutes. The annealed film is then cold stretched to 20% at room temperature, and then hot stretched to 160% and relaxed to 35% at 113° C. The MD stretched film has a thickness of 25.4 microns, and porosity of 39%. The MD stretched film is then TD stretched 400% at 115° C. with MD relax of 30%. The finished film has a thickness of 19.4 microns and porosity of 63%. TD tensile strength of finished film is 350 Kgf/cm$^2$.

Example 3

PP resin and HDPE resin are extruded using a co-extrusion die to form a PP/PE/PP tri-layer film. Extruder melt temperature for PP is 243° C., and extruder melt temperature for PE is 214° C. Polymer melt is then fed to a co-extrusion die which is set at 198° C. Polymer melt is cooled by blowing air. The extruded film has a thickness of 35.6 microns. The extruded precursor is then annealed at 125° C. for 2 minutes. The annealed film is then cold stretched to 45% at room temperature and hot stretched to 247% and relaxed to 42% at 113° C. The MD stretched film has a thickness of 21.5 microns and porosity of 29%. The MD stretched film is then TD stretched 450% at 115° C. with 50% MD relax. The finished film has a thickness of 16.3 microns and porosity of 59%. TD tensile strength of finished film is 570 Kgf/cm$^2$.

Example 4

PP resin and HDPE resin are co-extruded and MD stretched the same way as in example 3. The MD stretched film is then TD stretched 800% at 115° C. with 65% MD relax. The finished film has a thickness of 17.2 microns and porosity of 49%. TD tensile strength of finished film is 730 Kgf/cm$^2$.

Example 5

PP resin and PE resin are extruded using a co-extrusion die. Extruder melt temperature for PP is 230° C., and extruder melt for PE is 206° C. Polymer melt is then fed to a co-extrusion die which is set at 210° C. Polymer melt is then cooled by blowing air. The extruded film has a thickness of 36.0 microns. The extruded precursor is then annealed at 105° C. for 2 minutes. The annealed film is then cold stretched to 20%, and then hot stretched at 105° C. to 155% and then relaxed to 35%. The MD stretched film is then TD stretched 140% at 110° C. with 20% MD relax. The finished film has a thickness of 14.8 microns and porosity of 42%. TD tensile strength of finished film is 286 Kgf/cm$^2$.

Example 6

PP resin and PE resin are extruded using a co-extrusion die to form a PP/PE/PP trilayer film. Extruder melt temperature for PP is 245° C., and extruder melt temperature for PE is 230° C. Polymer melt is then fed to a co-extrusion die which is set at 225° C. Polymer melt is cooled by blowing air. The extruded film has a thickness of 27 microns and a birefringence of 0.0120. The extruded precursor is then annealed at 115° C. for 2 minutes. The annealed film is then cold stretched to 22% at room temperature and hot stretched to 254% and relaxed to 25% at 120° C. (total machine direction stretch=251%). The MD stretched film has a thickness of 15 microns and porosity of 16%. The MD stretched film is then TD stretched 260% at 130° C. with 50% MD relax, followed by a simultaneous MD and TD stretch of 50% and 216% in each direction at 130° C., and finally the film is held fast in the MD (100%) and allowed to relax 57.6% in the TD at a temperature of 130° C. The finished film has a thickness of 7.6 microns and porosity of 52%. TD tensile strength of finished film is 513 Kgf/cm$^2$.

Example 7

PP resin and PE resin are extruded using a co-extrusion die to form a PP/PE/PP trilayer film. Extruder melt temperature for PP is 222° C., and extruder melt temperature for PE is 225° C. Polymer melt is then fed to a co-extrusion die which is set at 215° C. Polymer melt is cooled by blowing air. The extruded film has a thickness of 40 microns and birefringence of 0.0110. The extruded precursor is then annealed at 105° C. for 2 minutes. The annealed film is then cold stretched to 36% at room temperature and hot stretched to 264% and relaxed to 29% at 109° C. (total machine direction stretch=271%). The MD stretched film has a thickness of 23.8 microns and porosity of 29.6%. The MD stretched film is then TD stretched 1034% at 110° C. with 75% MD relax. The finished film has a thickness of 16.8 microns and porosity of 46%. TD tensile strength of finished film is 1037 Kgf/cm².

Example 8

A PP based impact copolymer is extruded to form a film. Extruder melt temperature is 249° C. Polymer melt is fed to an extrusion die set at 215° C. The polymer melt is cooled by blowing air. The extruded film has a thickness of 34 µm and birefringence of 0.0116. The extruded precursor is then annealed at 154° C. for 2 minutes. The annealed film is then cold stretched to 30% at room temperature and hot stretched 190% and relaxed 61% at 140° C. (total machine direction stretch=159%). The MD stretched film has a thickness of 26 µm and porosity of 40%. The MD stretched film is then TD stretched 260% at 150° C. with 50% MD relax, followed by a simultaneous MD and TD stretch of 50% and 216%, respectively, at 150° C.

In the following table, Table 1, the results of the foregoing experiments are summarized and compared to two commercially available dry-stretched films: A) CELGARD® 2400 (single ply polypropylene membrane); and B) CELGARD® 2325 (tri-layer polypropylene/polyethylene/polypropylene membrane).

TABLE 1

|  | TD stretching | Thickness (um) | Porosity | TD Tensile strength (kgf/cm²) | MD Tensile strength (kgf/cm²) | MD/TD tensile ratio |
|---|---|---|---|---|---|---|
| A | N/A | 25.4 | 37% | 160 | 1700 | 10.6 |
| B | N/A | 25.1 | 40% | 146 | 1925 | 13.2 |
| Ex 1 | 300% | 14.1 | 37% | 550 | 1013 | 1.8 |
| Ex 2 | 400% | 19.4 | 63% | 350 | 627 | 1.8 |
| Ex 3 | 450% | 16.3 | 59% | 570 | 754 | 1.3 |
| Ex 4 | 800% | 17.2 | 49% | 730 | 646 | 0.9 |
| Ex 5 | 140% | 14.8 | 42% | 286 | 1080 | 3.8 |
| Ex 6 | 418% | 7.6 | 52% | 513 | 1437 | 2.8 |
| Ex 7 | 1034% | 16.8 | 46% | 1037 | 618 | 0.6 |
| Ex 8 | 450% | 17 | 73% | 287 | 558 | 1.9 |

Example 9

In this Example, a procedure similar to Example 8 was followed up through machine direction stretching. In particular, a PP based impact copolymer is extruded to form a film. Extruder melt temperature is 249° C. Polymer melt is fed to an extrusion die set at 215° C. The polymer melt is cooled by blowing air. The extruded film has a thickness of 34 µm and birefringence of 0.0116. The extruded precursor is then annealed at 154° C. for about 10 minutes. The annealed film is then cold stretched to 30% at room temperature and hot stretched 190% and relaxed 61% at 140° C. (total machine direction stretch=159%). The MD stretched film has a thickness of 26 µm and porosity of 40%.

Various multi-ply rolls of machine direction stretched film were then stretched in the transverse direction according to various conditions reported in Table 2 below.

TABLE 2

| Sample | Stretch Ratio (X) | Speed (feet per min) | Preheat Temp (F.) | Stretch Temp (F.) | Anneal Temp (F.) |
|---|---|---|---|---|---|
| Roll 9A | 4.8 | 7 | 320 | 310 | 310 |
| Roll 9B | 4.8 | 20 | 320 | 310 | 310 |
| Roll 9C | 4.8 | 7 | 310 | 300 | 300 |
| Roll 9D | 4.8 | 7 | 300 | 290 | 290 |
| Roll 9E | 4.8 | 7 | 290 | 280 | 280 |
| Roll 9F | 4.8 | 25 | 290 | 280 | 280 |

The process used in Example 9 did not include a simultaneous machine direction relax during TD stretching. And yet the results obtained were comparable to results obtained when such a simultaneous machine direction relax is employed during TD stretching. This means that various processes according to this embodiment may increase the throughput and/or speed of processes used to make microporous membranes and various wipes. See, for example, Rolls 9B and 9F, for which the speed through transverse stretching was 20 and 25 feet per minute, respectively, versus 7 feet per minute for other roll samples.

Once the various multi-ply roll samples described above were TD stretched, various properties of a ply of such rolls were determined, as shown in Table 3 below:

TABLE 3

| Roll | Basis Wt (gsm) | Thickness (µm, avg) | Thickness (std. dev., µm) |
|---|---|---|---|
| 9A | 2.6 | 10.356 | 2.244 |
| 9B | 2.3 | 15.576 | 1.196 |
| 9C | 2.7 | 18.46 | 0.89 |
| 9D | 3 | 15.84 | 1.116 |
| 9E | 3 | 17.303 | 1.37 |
| 9F | 3.1 | 17.06 | 0.956 |

Example 10

In the following examples, oil absorption testing was performed on various samples of microporous membrane wipes made in accordance with various objects of the present invention. Such wipes were compared with commercially available wipes. In particular, separate tests were performed using two types of oil (dodecane, a somewhat thin oil, and canola oil, a thicker oil, possibly more analogous to oil found in skin, such as fingers or face). The designated oil was poured into a 4" diameter petri dish to a depth of approximately 3 mm. A piece of paper towel was folded several times and placed in the petri dish such that the paper towel became saturated with oil. Facial blotter samples were cut into rectangular strips and were weighed on a Mettler Toledo AL104 laboratory scale to obtain the "pre-oiled weight." Next, each strip was placed on the saturated paper towel until the strip was fully saturated. The saturated strip was then weighed again to obtain the "oiled weight."

The facial blotter samples included the following:
1. Celgard® polypropylene copolymer microporous membrane wipe, 14-16 µm thickness, 3.0-3.6 gsm basis weight (Celgard® "EZ3030"). This material was tested in both single-layer and double-layer configurations. In some embodiments, these wipes were referred to as Celgard® premium facial blotters. These wipes were made in accordance with various embodiments of the present invention.
2. Comparative Japanese polypropylene facial blotter sold globally under the Clean & Clear® brand name and produced by 3M in Japan. Ingredients listed on the packaging for such facial blotters included polypropylene, mineral oil, dimethyldibenzylidene sorbitol, and ultramarines. Product procured in the US (see Table 5) was 37-39 μm thick with a basis weight of 25-26 gsm. Product procured in Taiwan (see Tables 4 and 5) was 39-43 μm thick with a basis weight of 25 gsm.

3. Comparative cellulose-based (or paper-based) facial blotters sold under the Cosmed and Petite Garden brand names. Ingredients listed on the packaging for the Cosmed facial blotters included 100% pure flax pulp. The Cosmed blotters were 22 μm thick with a basis weight of 16 gsm. The Petite Garden blotters were 28 μm thick with a basis weight of 16 gsm.

Testing was performed to determine oil absorption of dodecane for various samples, and the results are shown in Table 4 below. The oil absorption ratio represents the amount of oil absorbed (mg) divided by the pre-oiled weight of the particular sample.

TABLE 4

| Product type | Sample | Pre-oiled weight (mg) | Oiled weight (mg) | Oil (dodecane) absorption ratio (mg/mg) |
|---|---|---|---|---|
| Celgard ® single-layer PP membrane facial blotter (EZ3030) | 1 | 8.6 | 57.6 | 5.67 |
| | 2 | 9.0 | 55.9 | 5.19 |
| | 3 | 9.0 | 64.1 | 6.15 |
| | 4 | 8.2 | 51.7 | 5.33 |
| | Average: | | | 5.58 |
| Celgard ® two-layer PP membrane facial blotter (EZ3030) | 5 | 19.2 | 102.8 | 4.35 |
| | 6 | 19.4 | 101.0 | 4.22 |
| | 7 | 17.8 | 86.9 | 3.87 |
| | 8 | 16.7 | 89.0 | 4.34 |
| | Average: | | | 4.20 |
| Paper blotting sheet (Cosmed) | 9 | 62.6 | 131.3 | 1.10 |
| | 10 | 62.4 | 139.3 | 1.23 |
| | 11 | 61.0 | 142.9 | 1.34 |
| | 12 | 62.4 | 141.5 | 1.27 |
| | Average: | | | 1.23 |
| Paper blotting sheet (Petite Garden) | 13 | 46.8 | 97.1 | 1.07 |
| | 14 | 46.3 | 113.8 | 1.46 |
| | 15 | 48.3 | 99.7 | 1.06 |
| | 16 | 45.7 | 102.6 | 1.25 |
| | Average: | | | 1.21 |
| Plastic blotting sheet (Clean & Clear ®, sourced in Taiwan) | 17 | 57.0 | 94.2 | 0.65 |
| | 18 | 59.1 | 111.1 | 0.88 |
| | 19 | 55.8 | 102.1 | 0.83 |
| | 20 | 57.9 | 99.2 | 0.71 |
| | Average: | | | 0.77 |

The results above in Table 4 reveal that the single-layer and double-layer Celgard® polypropylene wipes according to the present invention performed better in oil absorption testing (using dodecane) than the comparative samples.

Testing was also performed to determine oil absorption of canola oil for various samples, and the results are shown in Table 5 below:

TABLE 5

| Product type | Sample | Pre-oiled weight (mg) | Oiled weight (mg) | Oil (canola oil) absorption ratio (mg/mg) |
|---|---|---|---|---|
| Celgard ® single-layer PP membrane facial blotter (EZ3030) | 21 | 8.7 | 118.9 | 12.61 |
| | 22 | 8.8 | 123.3 | 12.96 |
| | 23 | 7.2 | 110.0 | 14.35 |
| | 24 | 7.9 | 122.0 | 14.51 |
| | Average: | | | 13.61 |
| Celgard ® two-layer PP membrane facial blotter (EZ3030) | 25 | 17.9 | 171.2 | 8.58 |
| | 26 | 18.0 | 175.3 | 8.72 |
| | 27 | 18.3 | 174.3 | 8.51 |
| | 28 | 18.2 | 184.1 | 9.10 |
| | Average: | | | 8.73 |
| Paper blotting sheet (Cosmed) | 29 | 64.5 | 252.2 | 2.91 |
| | 30 | 62.2 | 238.3 | 2.83 |
| | 31 | 65.0 | 239.1 | 2.68 |
| | 32 | 62.9 | 250.1 | 2.97 |
| | Average: | | | 2.85 |
| Paper blotting sheet (Petite Garden) | 33 | 46.2 | 178.5 | 2.86 |
| | 34 | 47.8 | 179.2 | 2.75 |
| | 35 | 47.7 | 186.7 | 2.92 |
| | 36 | 46.1 | 171.7 | 2.72 |
| | Average: | | | 2.81 |
| Plastic blotting sheet (Clean & Clear ®, sourced in Taiwan) | 37 | 55.3 | 168.1 | 2.04 |
| | 38 | 54.2 | 162.2 | 1.99 |
| | 39 | 54.8 | 170.5 | 2.11 |
| | 40 | 55.7 | 170.4 | 2.06 |
| | Average: | | | 2.05 |
| Plastic blotting sheet (Clean & Clear ®, sourced in US) | 41 | 55.7 | 163.7 | 1.94 |
| | 42 | 57.7 | 158.6 | 1.75 |
| | 43 | 52.1 | 154.2 | 1.96 |
| | 44 | 55.8 | 161.4 | 1.89 |
| | Average: | | | 1.88 |

The results above in Table 5 reveal that the single-layer and double-layer Celgard® polypropylene wipes according to the present invention performed better in oil absorption testing (using canola oil) than the comparative samples.

In accordance with at least selected embodiments, aspects or objects, the present invention may relate to new or improved microporous membranes, new or improved porous membrane wipes, new or improved microporous membrane wipes, and/or methods of manufacture, marketing, and/or use thereof, toward a new or improved method for oil blotting utilizing a microporous membrane wipe, preferably an oil loving or oleophilic material, such as a polyolefin (PO), PP or PE microporous membrane wipe, preferably a dry process PO, PP or PE microporous membrane wipe, like use in blotting oil from one's skin or face, and/or the removal of fingerprint, smudges and the like from other surfaces like eyeglasses, electronics, cell phones, displays, optical devices, camera lenses, microscope lenses and other precision optics, and/or the like, to microporous membrane wipes that may be a uniaxially or a biaxially oriented microporous membrane, may be a uniaxially or biaxially oriented microporous membrane made from one or more copolymers, such as impact and/or block copolymers of polyethylene (PE) and/or polypropylene (PP), and/or the like.

The present invention may be embodied in other forms without departing from the spirit and the essential attributes thereof, and, accordingly, reference should be made to the appended claims, rather than to the foregoing specification, as indicating the scope of the invention. Additionally, the invention illustratively disclosed herein suitably may be practiced in the absence of any element which is not specifically disclosed herein.

The invention claimed is:

1. A microporous membrane wipe, comprising:
   a microporous polymer film made by a dry-stretch process, wherein said polymer is a semi-crystalline polymer, and said microporous polymer film has the following:

round shaped pores, said round shaped pores having an aspect ratio in the range of 0.75 to 1.25;

a ratio of machine direction tensile strength to transverse direction tensile strength in the range of 0.5 to 5.0, said transverse tensile strength being ≥175 Kgf/cm$^2$; an oil absorption ratio of from 3.87 to 14.51, the oil absorption ratio represents an amount of oil absorbed divided by the pre-oil weight of the microporous polymeric film, and dodecane or canola oil are used to determine the oil absorption ratio;

a thickness from 14 to 16 microns, a basis weight from 3 to 3.6 grams/m$^2$, an average pore size in the range of 0.03 to 0.50 microns; and a porosity in the range of 20-80%.

2. The microporous membrane wipe of claim 1 comprising: at least one layer of porous polymer film made by a dry-stretch process including the steps of: extruding a polymer into at least one layer nonporous precursor, and biaxially stretching the at least one layer nonporous precursor, the biaxial stretching including a machine direction stretching and a transverse direction stretching, the transverse direction stretching including a simultaneous controlled machine direction relax; and having a porosity of 40% to 90% and an Aquapore size of at least 0.06 microns.

3. The microporous membrane wipe of claim 2, wherein the machine direction stretching of biaxially stretching includes the step of transverse direction stretching with simultaneous machine direction stretching, and wherein biaxially stretching includes the step of transverse direction relax.

4. The microporous membrane wipe of claim 2, wherein biaxially stretching of nonporous precursor further includes an additional machine direction stretching step.

5. The microporous membrane wipe of claim 2, wherein said machine direction stretching is performed prior to said transverse direction stretching forming a porous intermediate.

6. The microporous membrane wipe of claim 2, wherein the nonporous precursor is one of a blown film and a slot die film.

7. The microporous membrane wipe of claim 2, wherein the nonporous precursor is a single layer or multilayer precursor formed by at least one of single layer extrusion and multilayer extrusion, or a multilayer precursor formed by at least one of coextrusion and lamination.

8. The microporous membrane wipe of claim 2, wherein the nonporous precursor is one of a single layer precursor and a multilayer precursor, said film has a hydro-head pressure greater than 965.3 kPa or 140 psi, said polymer being selected from the group consisting of polyolefins, fluorocarbons, polyamides, polyesters, polyacetals or polyoxymethylenes, polysulfides, polyphenyl sulfide, polyvinyl alcohols, impact copolymers, co-polymers of the foregoing polymers, blends of the foregoing polymers, and combinations of the foregoing polymers, the porous polymer film further having a porosity of 65% to 90%, a JIS (Japanese Industrial Standard) Gurley of less than 60, measured using the OHKEN permeability tester, and an Aquapore size of at least 0.08 microns, said biaxially stretching step of said dry-stretch process includes the simultaneous biaxial stretching of a plurality of separate, superimposed, layers or plies of nonporous precursor, wherein none of the plies are bonded together during the stretching process, or biaxially stretching step of said dry-stretch process includes the simultaneous biaxial stretching of a plurality of bonded, superimposed, layers or plies of nonporous precursor, wherein all of the plies are bonded together during the stretching process.

9. The microporous membrane wipe of claim 1, having a transverse direction tensile strength of at least 225 kgf/cm$_2$.

10. The microporous membrane wipe of claim 1, with the porous polymer film further having a transverse direction shrinkage of: less than 6.0% at 90° C.; and less than 15.0% at 120° C.

11. The microporous membrane wipe of claim 1, wherein the microporous membrane wipe has a thickness from 14 to 16 microns.

12. The microporous membrane wipe of claim 1, wherein the oil absorption ratio is above 4.20.

13. The microporous membrane wipe of claim 1, wherein the oil absorption ratio is above 5.19.

14. The microporous membrane wipe of claim 1, wherein the oil absorption ratio is above 8.51.

15. The microporous membrane wipe of claim 1, wherein the oil absorption ratio is above 12.61.

16. A method of making the microporous membrane wipe of claim 1, comprising the steps of:

extruding a polymer into a nonporous precursor, and biaxially stretching the nonporous precursor, the biaxial stretching including a machine direction stretching and a transverse direction stretching, the transverse direction stretching including a simultaneous controlled machine direction relax.

17. The method according to claim 16 wherein the polymer excludes any oils for subsequent removal to form pores or any pore-forming materials to facilitate pore formation, the polymer being selected from the group consisting of polyolefins, fluorocarbons, polyamides, polyesters, polyacetals or polyoxymethylenes, polysulfides, polyvinyl alcohols, co-polymers of the foregoing polymers, and combinations of the foregoing polymers, further comprising the step of:

annealing the non-porous precursor after extruding and before biaxially stretching, wherein annealing being conducted at a temperature in the range of $T_m-80°$ C. to $T_m-10°$ C., wherein $T_m$ indicates melt temperature of the polymer, wherein biaxially stretching comprising the steps of:

machine direction stretching, and thereafter transverse direction stretching including a simultaneous machine direction relax, wherein machine direction stretching being conducted either hot or cold or both, wherein cold machine direction stretching being conducted at a temperature <$T_m-50°$ C. and/or hot machine direction stretching being conducted at a temperature <$T_m-10°$ C., and/or wherein the total machine direction stretch being in the range of 50-500%, the total transverse direction stretch being in the range of 100-1200%, the machine direction relax from the transverse direction stretch being in the range of 5-80%, or combinations thereof.

* * * * *